United States Patent Office 3,672,751
Patented June 27, 1972

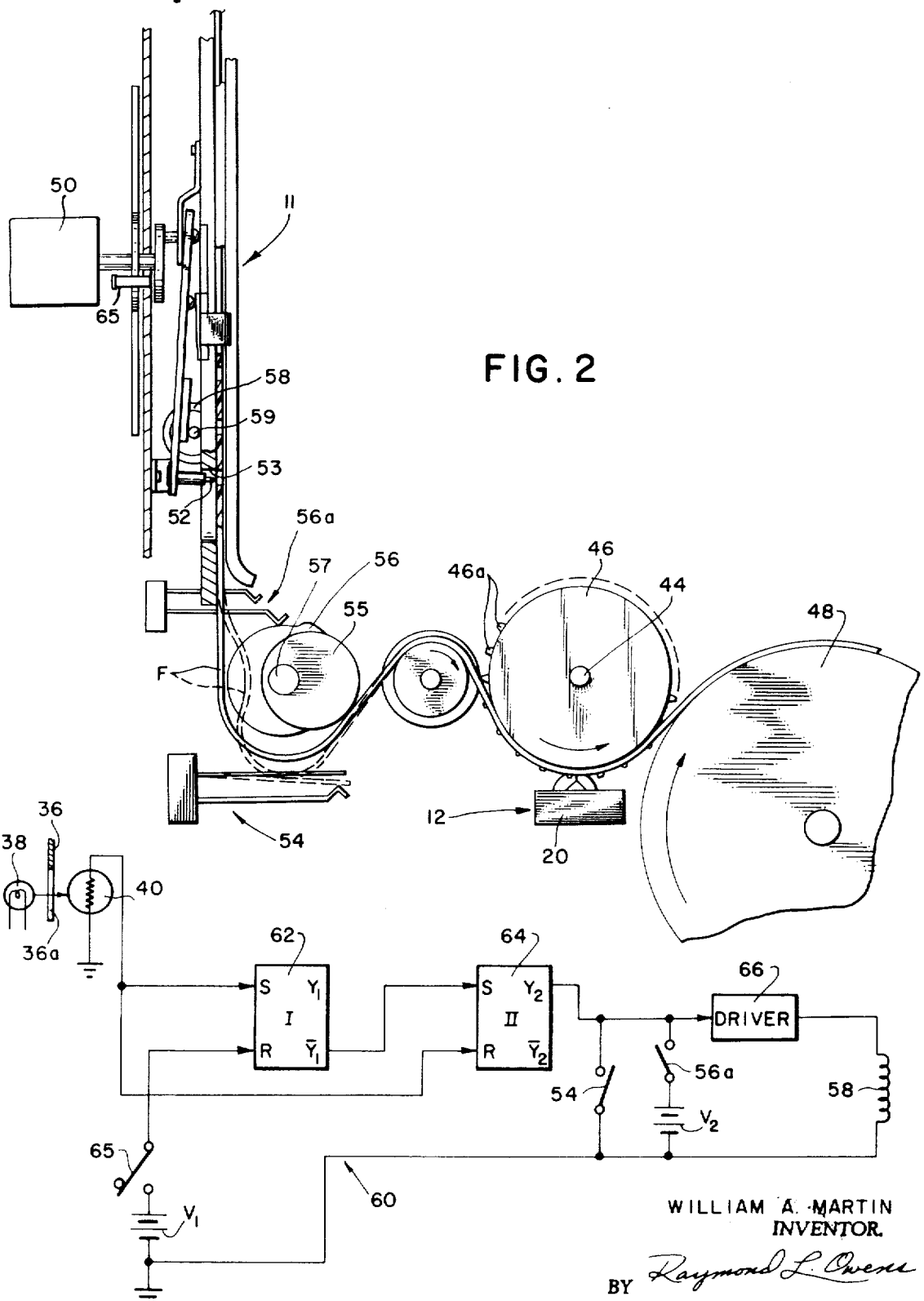

3,672,751
FILM ADVANCING APPARATUS
William Allen Martin, Rochester, N.Y., assignor to
Eastman Kodak Company, Rochester, N.Y.
Filed Dec. 2, 1970, Ser. No. 94,260
Int. Cl. G03b *21/48, 31/02*
U.S. Cl. 352—30        7 Claims

ABSTRACT OF THE DISCLOSURE

Film advancing apparatus for a motion picture projector includes a continuously driven film pulldown mechanism disposed along a first portion of a predetermined film path and having a claw member adapted to intermittently engage and move a filmstrip past an aperture of a film projection station. The apparatus also includes a continuously driven film transport mechanism disposed along a second portion of the path and having a portion engageable with the filmstrip and adapted to continuously move the filmstrip so that a sound track provided on the strip moves past a transducer at a substantially uniform speed. The apparatus further includes an electrically actuable member movable between a first position wherein it is effective to prevent the intermittent mechanism from moving film and a second position wherein it permits the intermittent mechanism to move film, and circuitry for actuating the electrically actuable member to move between its positions in response to the rate of film movement of the transport mechanism to adjust the rate of film movement of the intermittent mechanism as a function of the rate of film movement of the transport mechanism.

BACKGROUND OF THE INVENTION

The present invention relates to apparatus such as motion picture projectors which move a filmstrip intermittently in one portion of a film path and continuously in another portion thereof.

In a sound motion picture projection, it is desirable to move a filmstrip having a sound track thereon past a transducer at a uniform speed in order to achieve proper transfer of information between the sound track and the transducer. At the same time, however, in the usual motion picture projector, the filmstrip is moved with an intermittent motion in the image projection part of the apparatus. Often such intermittent motion tends to produce variations in the uniform speed of the film relative to the transducer which are reflected as unwanted pitch variations in the reproduced sound.

In order to overcome the problem of the mechanical feedback of intermittent motion from the intermittent film advancing mechanism to the constant speed film transport mechanism, separate drive motors for the intermittent and transport mechanisms have been employed. In U.S. Pat. No. 2,079,223 to Murdock, for example, separate motors are employed and the speed of the intermittent drive motor is varied to synchronize the rate of film movement of the intermittent mechanism with that of the transport mechanism.

U.S. Pat. 2,982,172 to Berkenhoff relates to a motion picture projector and also employs separate drive motors for the intermittent and film transport mechanisms. This patent discloses an apparatus wherein the rate of film movement of the intermittent mechanism is synchronized with the rate of film movement of the transport mechanism by means of a device which adjusts the speed of the intermittent mechanism drive motor in response to changes in the size of the loop of film formed between the intermittent and pulldown mechanism.

SUMMARY OF THE INVENTION

In the disclosed embodiment of the present invention, there is provided a motion picture projector which includes a continuously driven intermittent film advance mechanism having a claw member for intermittently engaging a filmstrip to move the filmstrip relative to a projection station along a first portion of a predetermined path and a continuously driven film transport mechanism having a portion engageable with the filmstrip for continuously moving the filmstrip at a uniform rate of movement along a second portion of the predetermined path past a transducer. The projector further includes means for producing an electrical signal representative of the rate at which film is moved by the transport mechanism and an electrically actuable member movable between a first and second position wherein it is effective to respectively prevent and permit filmstrip movement by the claw member in response to the signal to adjust the rate at which film is moved by the intermittent mechanism as a function of the rate of film movement produced by the film transport mechanism.

BRIEF DESCRIPTION OF THE DRAWINGS

In the detailed description of the preferred embodiment of the invention presented below, reference is made to the accompanying drawings, in which:

FIG. 2 is a partial front elevational view of the apparatus of FIG. 1; and

FIG. 3 is a schematic circuit diagram, partially in block form, of a representative circuit to control the operation of the apparatus of FIG. 1.

Figure 1:
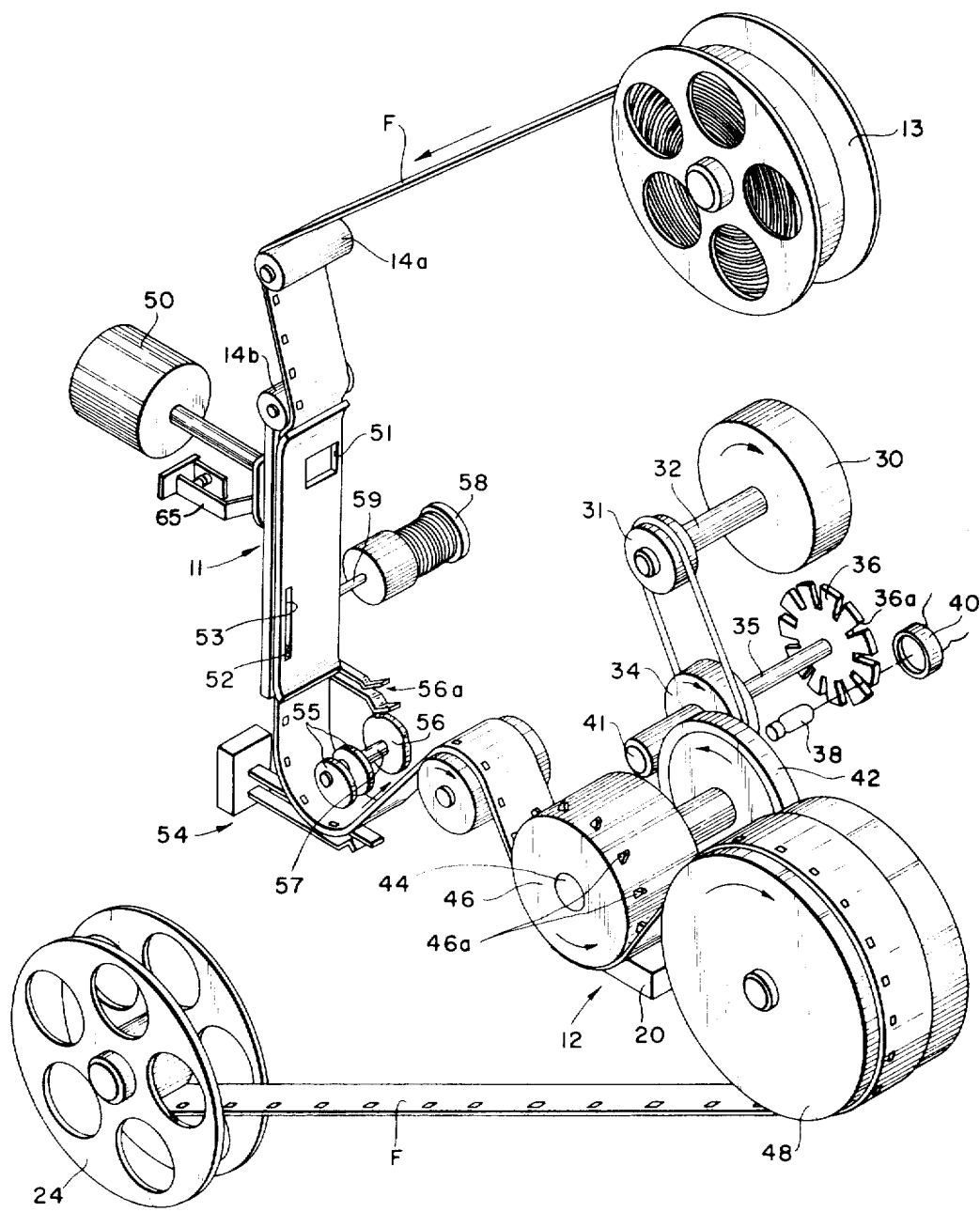
FIG. 1 is a pictorial illustration of a film advancing apparatus in accordance with the invention.

A preferred embodiment of the invention is disclosed in connection with a motion picture projector. Because such projectors are well known in the art, the present disclosure will be directed in particular to elements forming part of, or cooperating more directly with apparatus in accordance with the present invention, and it will be understood that apparatus not specifically shown or described may take various forms known in the prior art.

Referring now to FIGS. 1 and 2, there is shown a film advancing apparatus of a motion picture projector which is adapted to move a filmstrip F along a predetermined path and comprises an intermittent film pulldown mechanism 11 disposed adjacent the projector projection station and having a claw member 52 adapted to engage and intermittently move the filmstrip F along a first portion of the predetermined path. A transport mechanism 12 including a sprocket member 46 is disposed along another portion of the predetermined path and adapted to engage and continuously move the filmstrip F at a uniform rate of movement. In operation, the filmstrip F, which may comprise super 8 motion picture film having a magnetic sound track, spaced film frames, and spaced perforations, is guided by the apparatus 10 along the path in the following manner. After being unwound from a supply reel 13, the filmstrip F is guided over stabilizing rollers 14a and 14b and is moved into the projection station where it is engageable by intermittent mechanism 11. After leaving the projection station, the filmstrip forms a loop and then enters the transport mechanism 12 which continuously moves the film past a transducer 20 at a relatively uniform rate of speed so that the transducer 20 will pick up, without degradation, the audio information recorded on the sound track on the film. After leaving the transport mechanism 12, the film traverses the last portion of the path until it is finally guided onto a conventional take-up reel 24.

The transport mechanism 12 will now be described. A constant speed drive motor 30, which can be an electric battery driven motor, provides the sole moving force for continuously driving the transport mechanism 12. A pulley 31 is fixed to a driven shaft 32 of the motor. The pulley 31 is encircled by a belt for imparting rotation to a pulley 34 fixed to a rotatable shaft 35. At one end of the shaft 35 there is secured a scan disc 36 which cooperates with a lamp 38 and photocell 40, the operation of which is described hereinafter. Upon the opposite end of the shaft 35, there is secured a drive member 41 which is adapted to impart rotary motion to a capstan 42, fixed to a rotatable shaft 44. The shaft 44 carries the sprocket member 46 at one extreme end thereof. It should be noted that the transport mechanism is provided only with friction drive members and does not employ gears. Thus, there will be no speed variations imparted to the film due to backlash between meshing gears as sometimes occurs with prior art devices. The sprocket member 46 is provided with teeth 46a which enter perforations in the filmstrip F and continuously move the filmstrip F at a uniform rate of speed determined by the speed of operation of the motor 30. After leaving the sprocket 46, the filmstrip F is guided about a snubbing roller 48 and then moves onto the take-up reel 24. Although the transport mechanism 12 including a sprocket drive may take various forms known in the art, the transport mechanism disclosed in commonly assigned U.S. Pat. No. 3,387,755 entitled "Sprocket Sound Reproduction Apparatus and Method," in the name of W. A. Martin is especially suitable for use in the apparatus 10. It is an important feature of the invention that the transport mechanism motor 30 is not mechanically connected to the intermittent mechanism 11, and the operating speed of the motor 30 determines the rate at which film will move past the transducer 20, shown disposed below the sprocket 46.

The scan disc 36 has a series of slots 36a, each of which open onto its cylindrical periphery and are so disposed in relation to the lamp 38 and photocell 40 so that the photocell receives a burst of light each time the sprocket member 46 moves the film a predetermined distance. In the disclosed embodiment the slots 36a are spaced so that light is provided to the photocell each time the sprocket advances the film by a distance corresponding to the length of a single film frame. Thus, the photocell 40 is adapted to develop a cyclic pulse signal representative of the rate of film movement and of the movement of a single film frame by the transport mechanism 12. This signal is transmitted to electronic circuitry 60 (see FIG. 3) for controlling the rate of film movement of the intermittent mechanism 11. Alternatively, a photocell could be used to sense perforations in the filmstrip disposed near the transport mechanism 12 to determine the rate that film is moved by the mechanism 12.

The intermittent film advancing mechanism 11 may take a number of forms known in the art. The mechanism disclosed in commonly assigned copending U.S. patent application Ser. No. 69,807 filed Sept. 4, 1970 entitled "Drive for Projector Claw and Control System" in the name of W. A. Martin is especially suitable for use with the apparatus 10. Turning specifically to FIG. 1, a drive motor 50 provides the sole driving force for continuously driving the mechanism 11 and is adapted to continuously reciprocate the claw 52 which will execute the requisite up-down and in-out movement which are well understood in the art. For each cycle of the mechanism 11, the claw 52 will move into a guide slot 53 in the film gate under the urging of a spring, engage a perforation in the film, pull down a length of film corresponding to the length of one frame of the filmstrip F, thereby moving the next frame of film before the projection window 51. Thereafter, the claw 52 is withdrawn from the film perforation, advanced upward, and then moved inward to repeat the operation. The speed of the motor 50 is selected so that if the mechanism 11 were to advance a film frame in each pulldown cycle, the filmstrip would be moved at a rate (which we will define as the maximum rate) which is greater than the rate of film movement produced by the transport mechanism 12.

In accordance with the invention, the rate of film movement of the intermittent mechanism 11 is reduced from the maximum rate to a rate that coincides with the rate of film movement set by the motor 30. Towards this end, an electrically actuable solenoid 58 when de-energized is effective to maintain under the urging of resilient means (not shown), the pin 59 of the solenoid in a first position disposed in the inward path of the claw 52 thereby preventing the claw from executing its in-out movement while permitting it to undertake its up-down movement. When energized, the solenoid 50 exerts a force which overcomes the urging of the resilient means and withdraws the pin 59 from the inward path of the claw 52. An example of such a solenoid is disclosed in the above-mentioned patent application Ser. No. 69,807 filed in the name of W. A. Martin. Circuitry 60 (see FIG. 3) energizes the solenoid 58 to withdraw the pin 59 from the claw path permitting pulldown of film each time the photocell 40 receives a burst of light. Shortly thereafter, the circuitry 60 will de-energize the solenoid and be conditioned to await the next burst of light.

As noted previously, at the bottom of the mechanism 11, the filmstrip forms a loop of film. If the mechanism 11 moves film at a rate slightly greater than the rate at which film is moved by the transport mechanism 12, the size of the loop will eventually become greater than a predetermined size (which is referred to as a long loop condition). In this event, the loop will engage and close contacts of a switch 54 which will hold the solenoid 58 in a de-energized condition and thus prevent the mechanism 11 from moving the filmstrip until the long loop condition is relieved as will be explained in connection with the description of the circuit 60 shown in FIG. 3 which shortly follows. On the other hand, if the size of the loop should become smaller than a predetermined size, two eccentrics 55, fixedly secured to rotatable shaft 57, will be engaged by the moving filmstrip F. After engagement, the filmstrip will rotate the shaft 57 causing a cam 56 secured to the shaft 57 to close a switch 56a energizing the solenoid 58. Thereafter mechanism 11 will advance two frames of film (one at a time) before the eccentrics open the switch 56a. This relieves the short loop condition.

Turning now to FIG. 3, the control circuit 60 is shown to include two flip flops (F/F) 62 and 64. The F/F 64 provides an output signal ($Y_2$ after being set) to a solenoid driver circuitry 66 which is adapted to energize the solenoid coil 58. To de-energize the solenoid 58, the F/F 64 must change states by being reset.

In operation, the photocell 40, in response to light passed by the disc 36, produces a cyclic input signal (corresponding to the rate of film movement of the mechanism 12) which is applied as an input to the set input side S of the F/F 62 and also as an input to the reset input side R of the F/F 64. Upon being reset, the F/F 64 causes the solenoid 58 to be de-energized. The intermittent mechanism 11 operates a switch 65 which closes when the mechanism 11 is in a position in the cycle of operation prior to when a film pulldown stroke is about to be executed (viz when the claw is moving upward and is disengaged from the film). The switch 65 may be conveniently operated by the "up-down" cam of the mechanism 11, as will be understood by those in the art. This switch momentarily opens and then closes, briefly coupling a source of potential $V_1$ to the reset input R of the F/F 62. After a slight time delay, the F/F 62 provides a signal $\overline{Y}_1$ to the set input S of F/F 64. It is the rising edge of the signal $\overline{Y}_1$ which causes F/F 64 to be set. The F/F 64 when set energizes the driver circuitry causing it to energize the solenoid 58 withdrawing the pin 59 from the inward path of the claw 52 permitting film pulldown. Thereafter, the switch 65 opens and the circuit 60 is conditioned to repeat the above operation upon receiving a pulse from the photocell 40.

If in operation the long loop switch 54 should close, the output of F/F 64 will be coupled by a path through the closed switch 54 to ground, and the coil 58 will remain de-energized until the long loop condition is relieved. For the short loop condition, the switch 56a, when closed, causes a source of potential $V_2$ to be applied across the solenoid driver circuitry 66, energizing the coil 58. The coil 58 will remain energized until the short loop condition is relieved, at which time the switch 56a will open. The sequencing of the circuit 60 should, of course, be judiciously selected to prevent any interference between the pin 59 and the mechanism 11 as the pin 59 moves into and out of the inward path of the claw 52.

Summarizing, an electrical signal is produced which is representative of the speed that film is advanced by the transport mechanism 12. This signal is then used to adjust the rate of film advance by the intermittent mechanism 11 without the need for mechanical coupling of these two mechanisms.

The invention has been described in detail with particular reference to a preferred embodiment thereof, but it will be understood that variations and modifications can be effected within the spirit and scope of the invention.

I claim:

1. Film advancing apparatus for moving a filmstrip along a predetermined film path, the apparatus comprising:
   (a) a mechanism disposed along a first portion of the predetermined path and adapted to be continuously driven, said mechanism including a claw member adapted to intermittently engage and move the filmstrip along the first portion of the film path;
   (b) an electrically actuable member disposed adjacent said mechanism and movable between a first position wherein it is effective to prevent film movement by said claw member and a second position wherein it is effective to permit said claw member to move the filmstrip;
   (c) a transport mechanism disposed along a second portion of the predetermined path and adapted to be continuously driven, said transport mechanism having a portion engageable with the filmstrip for continuously moving the filmstrip along the second portion of the film path with a uniform rate of movement;
   (d) sensing means for producing a signal representative of the rate of filmstrip movement imparted by said transport mechanism in the second portion of the path; and
   (e) means coupled to said actuable member and responsive to said electrical signal produced by said sensing means for actuating said actuable member to cause said actuable member to move between the first and second positions thereby to adjust the rate of film movement of said intermittent mechanism as a function of the rate of film movement of said transport mechanism.

2. Film advancing apparatus for moving a filmstrip along a predetermined path, comprising:
   (a) a mechanism disposed along a first portion of the predetermined path and adapted to be continuously driven, said mechanism including a claw member adapted to intermittently engage and move the filmstrip;
   (b) an electrical actuable member disposed adjacent said mechanism being normally disposed in a first position wherein it is effective to prevent film movement by said claw member and movable when actuated to a second position wherein it is effective to permit said claw member to move the filmstrip along the first portion of the film path;
   (c) a transport mechanism disposed along a second portion of the predetermined path and adapted to be continuously driven, said transport mechanism having a portion engageable with the filmstrip for continuously moving the filmstrip along the second portion of the film path with a uniform rate of movement;
   (d) sensing means for producing a signal representative of the rate of filmstrip movement imparted by said transport mechanism in the second portion of the path; and
   (e) means coupled to said actuable member and responsive to said electrical signal produced by said sensing means for actuating said actuable member to cause said actuable member to reciprocate between the first and the second positions to adjust the rate of film movement of said intermittent mechanism as a function of the rate of film movement of said transport mechanism.

3. Film advancing apparatus for moving a filmstrip along a predetermined path, comprising:
   (a) a continuously driven mechanism disposed along a first portion of the predetermined path, said mechanism including a claw member adapted to intermittently engage and move the filmstrip along the first portion of the film path;
   (b) an electrical actuable member disposed adjacent said mechanism being normally disposed in a first position wherein the electrically actuable member is effective to prevent film movement by said claw member and movable when actuated to a second position wherein it is effective to permit said claw member to move the filmstrip;
   (c) a continuously driven transport mechanism disposed along a second portion of the predetermined path, said transport mechanism having a portion engageable with the filmstrip for continuously moving the filmstrip along the second portion of the film path with a uniform rate of movement;
   (d) sensing means for producing a signal representative of the rate of filmstrip movement imparted by said transport mechanism in the second portion of the path;
   (e) means coupled to said actuable member and responsive to said electrical signal produced by said sensing means for actuating said actuable member to cause said actuable member to reciprocate between the first and second positions to adjust the rate of film movement of said intermittent mechanism as a function of the rate of film movement of said transport mechanism; and
   (f) loop control means disposed along a third portion of the predetermined path between said first and second portions wherein the filmstrip forms a loop, said loop control means being responsive to the size of said loop being greater than a first predetermined size to move said actuable member to said first position and maintain said actuable member in said first position, thereby to prevent film movement of said intermittent mechanism until said loop size declines to a size less than said first predetermined size.

4. The invention as set forth in claim 3 wherein said loop control means includes means responsive to the size of said loop being smaller than a second predetermined size to cause said actuable member to move to said second position and to maintain said actuable member in said second position until the loop size increases to a size less than said second predetermined size.

5. The invention as set forth in claim 4 wherein said electrically actuable member includes a pin member which in said first position is adapted to be engaged by said claw member to prevent said claw member from engaging and moving the filmstrip and in said second position for withdrawing from engagement of said claw member.

6. The invention as set forth in claim 5 wherein said electrical signal producing means comprises a source of light, photosensitive means disposed in a cooperative relation with said light source and adapted to produce said electrical signal in response to incident light from said source, and disc means coupled to said transport mechanism and interposed between said light source and said photosensitive means and responsive to movement of said transport mechanism to pass a burst of light from said light source to said photosensitive means each time a predetermined length of filmstrip is moved by said transport mechanism.

7. The invention as set forth in claim 6 wherein said signal responsive means includes logic means responsive to said electrical signal for changing said electrically actuable member between positions.

References Cited

UNITED STATES PATENTS

| 2,079,223 | 5/1937 | Murdock | 352—15 X |
|---|---|---|---|
| 2,982,172 | 5/1961 | Berkenhoff | 352—14 |
| 3,124,995 | 3/1964 | Hennessey | 352—30 X |
| 3,387,755 | 6/1968 | Martin | 226—6 |

SAMUEL S. MATTHEWS, Primary Examiner

M. L. GELLNER, Assistant Examiner

U.S. Cl. X.R.

226—9, 117; 352—180